Sept. 13, 1927.
L. N. MILLER
1,642,504
CAR CONSTRUCTION
Filed July 22, 1926
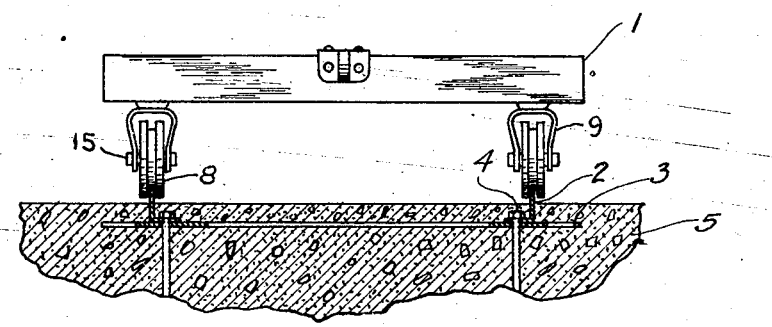
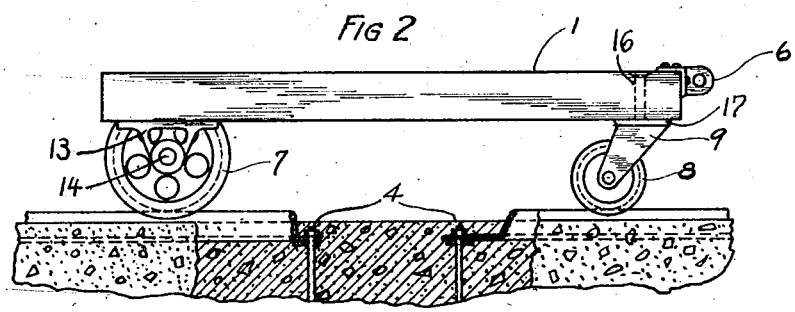
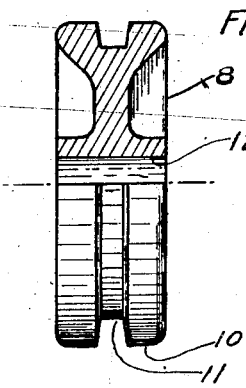
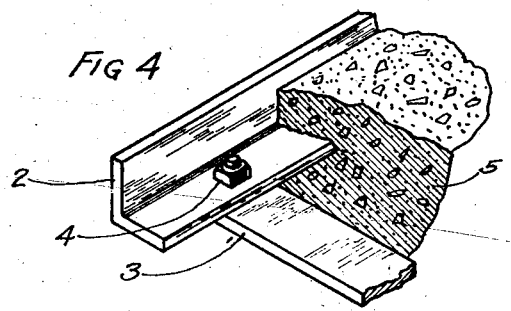
INVENTOR.
L. N. Miller
BY H. W. Baker
ATTORNEY Patented Sept. 13, 1927.

1,642,504

UNITED STATES PATENT OFFICE.

LAURITZ N. MILLER, OF EUGENE, OREGON.

CAR CONSTRUCTION.

Application filed July 22, 1926. Serial No. 124,213.

This invention relates to a novel car construction and more particularly to a car used in the drying of fruit.

One of the objects of this invention is to provide a car having grooved wheels adapted to run on a rail, the front wheels being pivoted, forming casters, so that the car may be turned at right angles after leaving the trackway in order that it may be removed through a side door. Each of the wheels in addition to being grooved is provided with relatively wide flanges on each side of the groove so that the car may be moved easily on a concrete floor.

Other objects and advantages of this invention will appear in the detailed description of the invention.

In the annexed drawings forming a part of the specification,

Fig. 1 is a front view of the car and a sectional view of the track arrangement, the rear axle of the car being omitted from the drawing for the sake of clearness.

Fig. 2 is a side elevational view of the car, and a sectional view of the track arrangement.

Fig. 3 is a detailed view, partly in section, of one of the wheels, and

Fig. 4 is a fragmentary sectional view of the track arrangement with the concrete supporting the same.

Referring to the drawings in detail, in which like reference characters are used throughout, the car is provided with a body 1, which car is adapted to run on rails 2 formed of angle-irons or other suitable construction, which angle-irons are secured to cross-ties 3 by means of bolts 4. The angle-irons, cross-ties and bolts are embedded in a concrete foundation 5.

Any suitable device may be employed for pulling the car forward, such as coupling member 6.

The rear portion of the car is provided with stationary bearings 13, in which are mounted an axle 14, to which axle the rear wheels 7 are secured.

The front wheels 8 are secured to short axles 15 which are mounted in a U shaped bearing 9 provided with a bolt 16 passing upwardly through a bearing plate 17 and through the front portion of the body 1. The front wheels are, therefore, casters.

All of the wheels are of similar construction as shown in detail in Fig. 3. Each is provided with a bore 12 adapted to receive one of the axles 14 or 15. Each of the wheels is provided with a channel or groove 11, which channel receives the rail or trackway 2. On each side of the groove 11, a wide flange 10 is provided, on which the car rolls when on concrete, the floor or the ground. The flanges, being wide, will not cut into the supporting surface. The car may, therefore, be run either on a trackway or on a flat surface.

While this car is designed primarily to be used in a drying kiln for fruit such as prunes, it is obvious that it has a general utility and may be used with advantage under many other conditions. It is particularly useful in the fruit drying business, however, for in the drying of fruit long tunnels are provided through which heated air is forced. With such a car and trackway, the car may be pushed into one end of the tunnel on the trackway and a rope or other pulling means attached to the coupler 6, the rope extending to the other end of the tunnel. These tunnels are but slightly wider than the width of the car and the trays of fruit resting thereon. Some guiding means is necessary so that the cars will not run against the side of the tunnel and dump the fruit. After the car has been pulled through the tunnel, it is necessary to turn the car at right angles so as to roll it through a side door. This car and track construction has been designed primarly for such a use, but it is desired to claim the invention regardless of what use to which it may be applied.

Having now described my invention, I claim:

1. A car provided with rear wheels having fixed axes, and front wheels of caster contruction, each of said wheels being adapted either to receive a trackway or to run on a surface.

2. A car provided with a body, rear wheels having fixed axes being secured to said body, and front wheels pivotally connected to said body, the pivoted construction of the front wheels permitting the car to be readily turned in any direction, each of the wheels of the car being grooved to receive a trackway.

3. A car provided with a body, rear wheels mounted on fixed axes, and front wheels mounted on revolvable axes, each of said wheels being grooved to receive a trackway and provided with wide flanges adapted to run on a surface without cutting into the same.

4. A car provided with a body, back wheels having a common axis connected to the body, and front wheels of caster construction, each of said wheels being provided with a cutaway portion adapted to receive a track and a wide portion adapted to run on a surface.

In testimony whereof I affix my signature.

LAURITZ N. MILLER.